United States Patent
Ashley

(10) Patent No.: US 8,601,577 B1
(45) Date of Patent: Dec. 3, 2013

(54) USING CONFIGURED ERROR CODES TO ENABLE SPAM BLOCKING DOWNSTREAM FROM A MAIL TRANSFER AGENT

(75) Inventor: Peter Ashley, Hopkinton, MA (US)

(73) Assignee: Symantec Corporation, Mountain View, CA (US)

(*) Notice: Subject to any disclaimer, the term of this patent is extended or adjusted under 35 U.S.C. 154(b) by 343 days.

(21) Appl. No.: 12/963,435

(22) Filed: Dec. 8, 2010

(51) Int. Cl.
*G06F 11/00* (2006.01)

(52) U.S. Cl.
USPC .......................................................... 726/22

(58) Field of Classification Search
USPC .......................................................... 726/22
See application file for complete search history.

(56) References Cited

U.S. PATENT DOCUMENTS

| | | |
|---|---|---|
| 7,490,128 B1* | 2/2009 | White et al. ............... 709/206 |
| 2006/0036690 A1* | 2/2006 | O'Neil ....................... 709/206 |
| 2006/0037070 A1* | 2/2006 | Davis et al. ................ 726/11 |

* cited by examiner

*Primary Examiner* — Peter Shaw
(74) *Attorney, Agent, or Firm* — Brill Law Office; Jeffrey Brill

(57) ABSTRACT

A message transfer agent generates specific error codes indicating that it has adjudicated specific received email traffic to comprise spam. The message transfer agent transmits the generated specific error codes to the sources of the specific received email traffic. An antispam computing device filters email traffic, and receives the error codes transmitted by the message transfer agent to the sources of email traffic. The antispam computing device interprets the specific received error codes as indicating that the message transfer agent adjudicated the specific email traffic to comprise spam. In response, the antispam computing device can block email traffic from these sources, such that the blocked email traffic does not reach the message transfer agent.

18 Claims, 4 Drawing Sheets

//USING CONFIGURED ERROR CODES TO
ENABLE SPAM BLOCKING DOWNSTREAM
FROM A MAIL TRANSFER AGENT

TECHNICAL FIELD

This disclosure pertains generally to antispam technology, and more specifically to using specific error codes to provide information concerning sources of email messages to an antispam device.

BACKGROUND

Spam accounts for a large percentage of all email traffic on the internet. The volume of spam places a large burden on Mail Transfer Agents (MTAs), which are computing devices that transfer email messages between network components. Where an MTA uses a disproportionate amount of its resources for antispam processing (e.g., detection, blocking, etc.), its performance suffers, and the conventional delivery of legitimate email messages can become delayed. It is therefore desirable to offload antispam processing from MTAs to dedicated antispam computing devices. To this end, antispam processing can be implemented on a transparent proxy or antispam gateway that resides between an MTA that receives and processes incoming email messages for an enterprise and the sources of those email messages. Since the antispam device resides between the MTA and the sources of incoming email messages, the antispam device can filter the email traffic between these endpoints. To the extent that the antispam device can perform antispam processing that would otherwise be conducted by the MTA, the MTA is freed to use its resources for non-spam related email transfer functionality.

Antispam processing takes different forms. One form is the analysis of the content in email messages to determine whether the email messages comprise spam. This technique requires access to the content of email messages (not just the addresses of origination). Blocking an incoming spam message based on its content is known as content time blocking. Another form of antispam processing involves determining whether email comprises spam based on factors that do not require actually receiving and analyzing the content, such as the identity of the source attempting to deliver the message. Blocking a message prior to actually receiving it is known as connection time blocking.

Some antispam technologies involve analyzing patterns of email activity associated with given sources, and learning reputations of multiple sources over time. The analysis required to learn a reputation typically involves analyzing message content, but once it has been learned that a given source has a bad reputation (e.g., the source is associated with sending a sufficient amount of spam), blocking of messages originating from that source can occur at connection time rather than content time.

An antispam device filtering email traffic for an MTA may lack certain information for performing antispam processing. Where the MTA performs connection time blocking, the antispam device is unable to analyze the content of the blocked messages and thus learn reputations of the sources from which the messages originated. Furthermore, the receiving MTA might have additional antispam information not available to the antispam device, such as a blacklist of blocked senders or reputation information concerning given sources. When email content and/or additional antispam information is not available to the antispam device, the ability to offload antispam processing from the MTA to the antispam device is limited. More specifically, without access to the content of email messages and additional relevant information the MTA may have, the antispam device is hindered in its ability to learn reputations of sources. Without the antispam device being able to perform such learning, the associated connection time blocking of email from sources with bad reputations cannot be offloaded from the receiving MTA. This causes excessive capacity demands on the receiving MTA to process spam traffic.

It would be desirable to address these issues.

SUMMARY

Special error codes are used to unload blocking of spam email traffic from a message transfer agent to an antispam computing device. The message transfer agent generates specific error codes indicating that the message transfer agent has adjudicated specific received email traffic to comprise spam. The message transfer agent transmits the generated specific error codes to the sources of the specific received email traffic. The specific error codes can, for example, be in the error code format of the protocol used for the email traffic. The antispam computing device filters email traffic between the message transfer agent and a plurality of sources of email traffic. Thus, the antispam computing device receives error codes transmitted by the message transfer agent to the sources of email traffic. The antispam computing device interprets the specific received error codes as indicating that the message transfer agent adjudicated the specific email traffic to comprise spam. This can comprise interpreting error codes with specific values as indicating that the message transfer agent adjudicated specific email traffic to be spam at connection time or at content time. In response, the antispam computing device can block email traffic from these sources, such that the blocked email traffic does not reach the message transfer agent.

In some embodiments, the antispam computing device determines reputations of specific sources of email traffic based on error codes received from the message transfer agent sent to the specific sources. This can further involve analyzing the content of email messages available to the antispam computing device, and using this analysis of the email content to aid in determining the reputations. The antispam computing device can then block attempts to deliver email messages by sources based on their determined reputations, such that the blocked attempts do not reach the message transfer agent.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
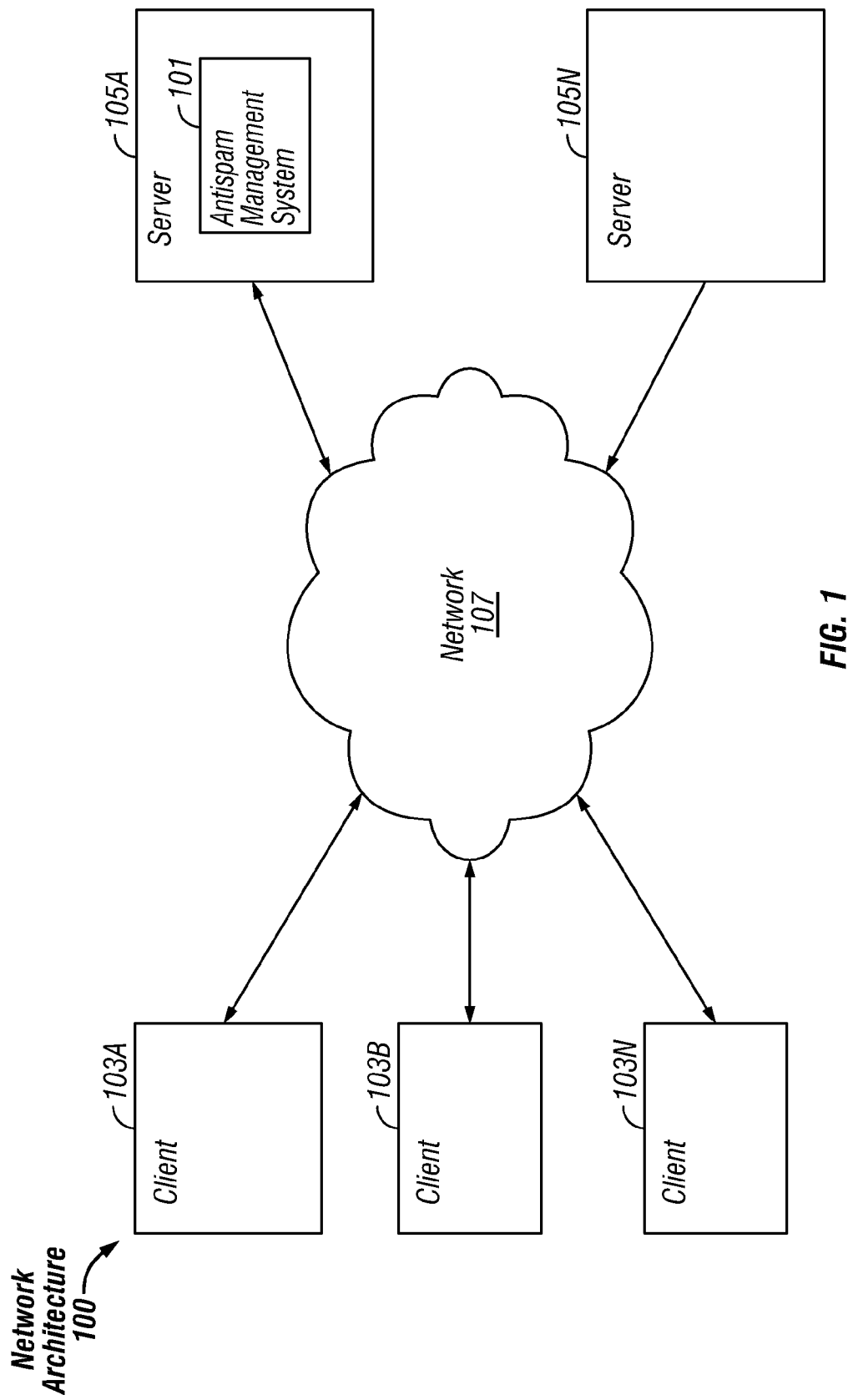
FIG. 1 is a block diagram of an exemplary network architecture in which an antispam management system can be implemented, according to some embodiments.

FIG. 1 is a block diagram illustrating an exemplary network architecture 100 in which an antispam management system 101 can be implemented. The illustrated network architecture 100 comprises multiple clients 103A, 103B and 103N, as well as multiple servers 105A and 105N. In FIG. 1, the antispam management system 101 is illustrated as residing on server 105A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
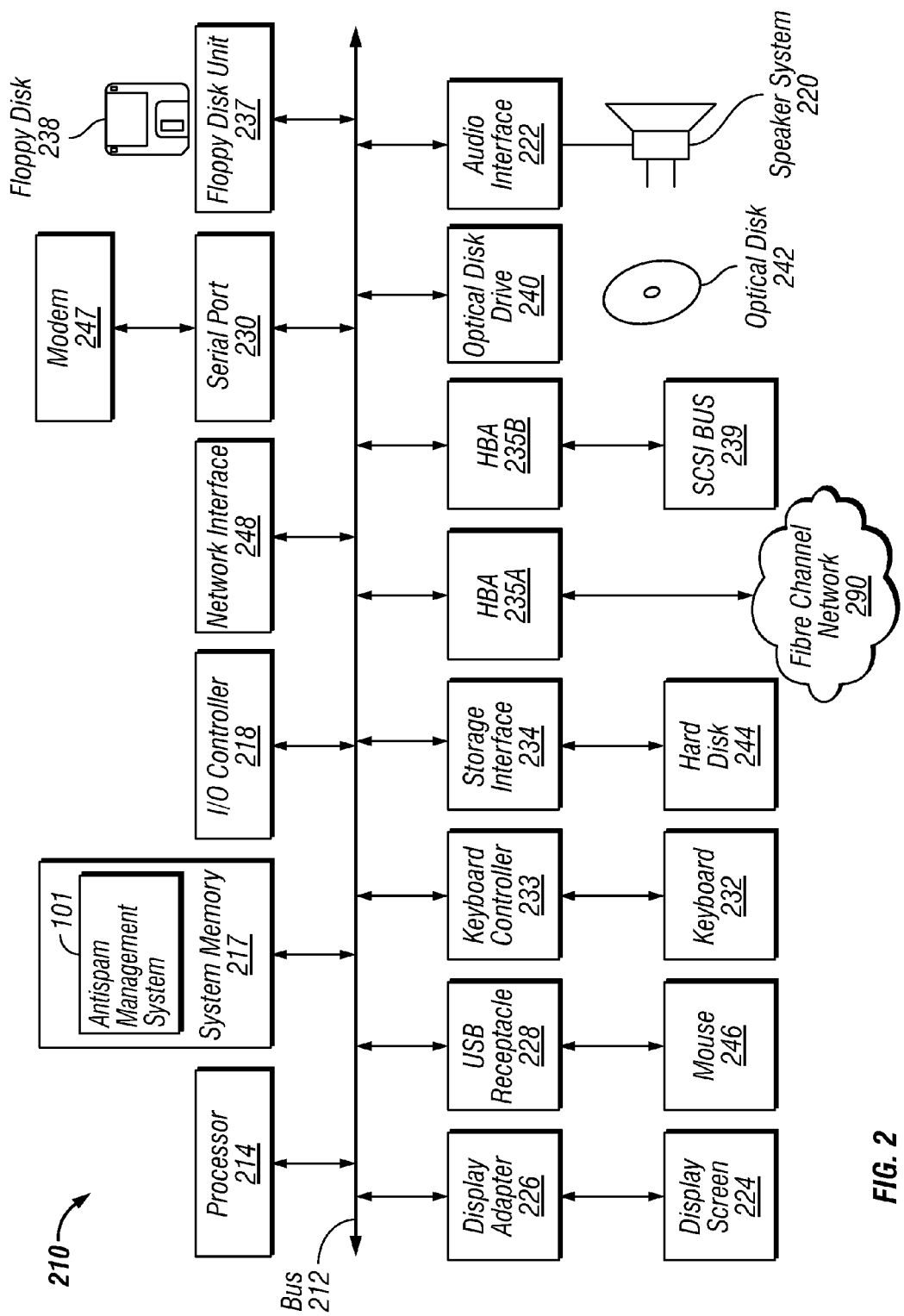
FIG. 2 is a block diagram of a computer system suitable for implementing an antispam management system, according to some embodiments.

FIG. 2 is a block diagram of a computer system 210 suitable for implementing an antispam management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the antispam management system 101 is illustrated as residing in system memory 217. The workings of the antispam management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
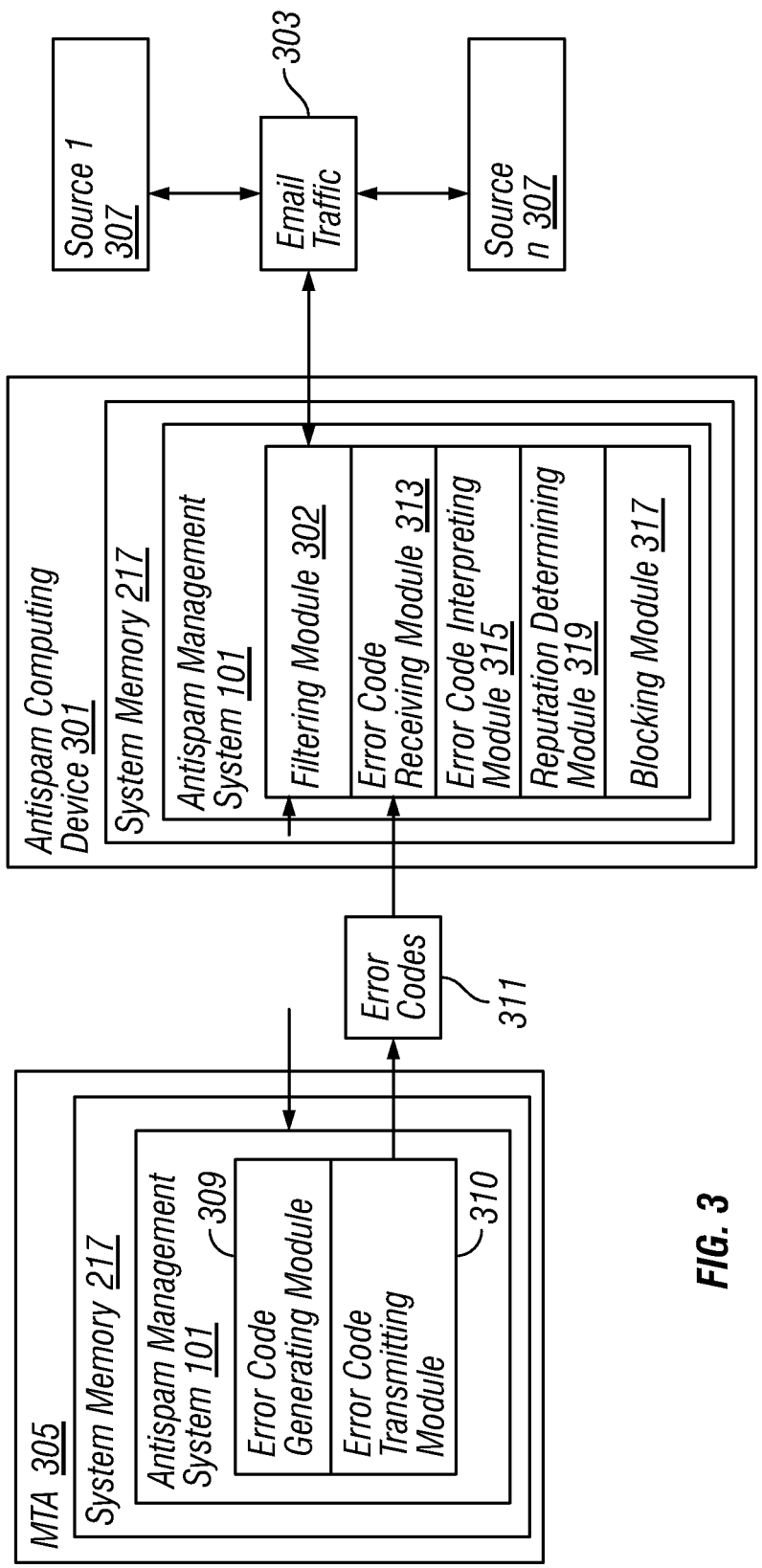
FIG. 3 is a block diagram of the operation of an antispam management system, according to some embodiments.

FIG. 3 illustrates the operation of an antispam management system 101 residing in the system memory 217 of an antispam computing device 301, which is in the form of a computer 210. More specifically, the antispam computing device 301 can be in the form of a transparent antispam (filtering) proxy or an antispam gateway. As described above, the functionalities of the antispam management system 101 can reside on a client 103, a server 105, or be distributed between multiple computer systems 210, including within a cloud-based computing environment in which the functionality of the antispam management system 101 is provided as a service over a network 107. It is to be understood that although the antispam management system 101 is illustrated in FIG. 3 as a single entity, the illustrated antispam management system 101 represents a collection of functionalities, which can be instantiated as a single or multiple modules as desired (an instantiation of specific, multiple modules of the antispam management system 101 is illustrated in FIG. 3). It is to be understood that the modules of the antispam management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the antispam management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, an antispam management system 101 runs on an antispam computing device 301, and a filtering module 302 of the antispam management system 101 filters email traffic 303 between an MTA 305 and a plurality of sources 307 of email traffic 303. Additionally, an error code generating module 309 and an error code transmitting module 310 of the antispam management system 101 run on the MTA 305. The MTA receives email traffic 303, and uses conventional functionality to perform both connection time and content time blocking of email traffic 303 that it adjudicates to be spam. In addition, when the MTA 305 adjudicates email traffic 303 to comprise spam, the error code generating module 309 of the antispam management system 101 running on the MTA 305 generates a specific error code 311. These error codes 311 are typically in the error code format of the protocol of the email traffic 303 (e.g., Simple Mail Transfer Protocol, SMTP). The error code transmitting module 310 of the antispam management system 101 running on the MTA 305 returns these error codes 311 to email senders as if actual errors had occurred (e.g., transmission errors or the like). However, these error codes 311 are designed to alert the antispam management system 101 running on the antispam computing device 301 that the specific blocked email traffic 303 comprises spam. Because the antispam management system 101 is filtering the email traffic 303 between the MTA 305 and the sources 307 of email traffic 303, the antispam management system 101 receives the error codes 311 transmitted to the sources 307 by the error code transmitting module 310 on the MTA 305. As described in greater detail below, the antispam management system 101 interprets the error codes 311 as indicating that the MTA 305 has adjudicated the email traffic 303 in question to be spam.

In different embodiments, the error codes 311 can indicate different levels of detail of information. In one embodiment, a single numerical (or other suitable) value is always used, which simply indicates that the MTA 305 adjudicated the email traffic 303 that resulted in the sending of the error code 311 to comprise spam. In other embodiments, multiple numerical values are used to indicate more detailed information. For example, one specific value can indicate that the adjudication was based on the content of an email message 303, whereas another can indicate that the adjudication was made at connection time, based on the source 307. Even more specific information can be contained in error messages 311, including specific actions for the antispam management system 101 to take in response (e.g., blacklist the source 307 of this email 303, block all transmissions from this source 307 for a set period of time, etc.). Typically, the specific value(s) used for the error codes 311 are distinct from those used for bona fide errors, so that the antispam management system 101 is able to interpret them unambiguously.

An error code receiving module 313 of the antispam management system 101 running on the antispam computing device 301 receives error codes 311 sent by the MTA 305 to specific sources 307 in response to specific email traffic 303. An error code interpreting module 315 of the antispam management system 101 is configured to interpret specific error codes 311 as spam verdicts by the MTA 305 on the corresponding email traffic 303. As noted above, in some embodiments specific error codes 311 indicate more detailed information concerning such adjudications. Based on the interpretation of the error codes 311, a blocking module 317 of the antispam management system 101 can subsequently block future email traffic 303 before it reaches the MTA 305. More specifically, the blocking module 317 can block email traffic 303 as indicated by the error codes 311 (e.g., block all email traffic 303 from this source 307, block email traffic 303 from this source 307 for a given period of time, etc.). In some embodiments, a source reputation determining module 319 of the antispam management system 101 uses adaptive learning techniques to determine reputations of sources 307 of email traffic 303, based on interpretations of error codes 311 sent to those sources 307 by the MTA 305 over time. Where content of email messages is available to the antispam management system 101 running on the antispam device 301, the reputation determining module 319 can analyze the content of email messages from specific sources 307, and use this analysis to aid in the determination of the reputations. In any case, the blocking module 317 can subsequently block email traffic 303 from specific sources 307 based on their reputations.

By blocking email traffic 303 before it reaches the MTA 305 based on error codes 311, the antispam management system 101 is able to perform antispam processing that otherwise would be performed by the MTA 305. This frees the MTA 305 to use its limited resources in other ways.

Figure 4:
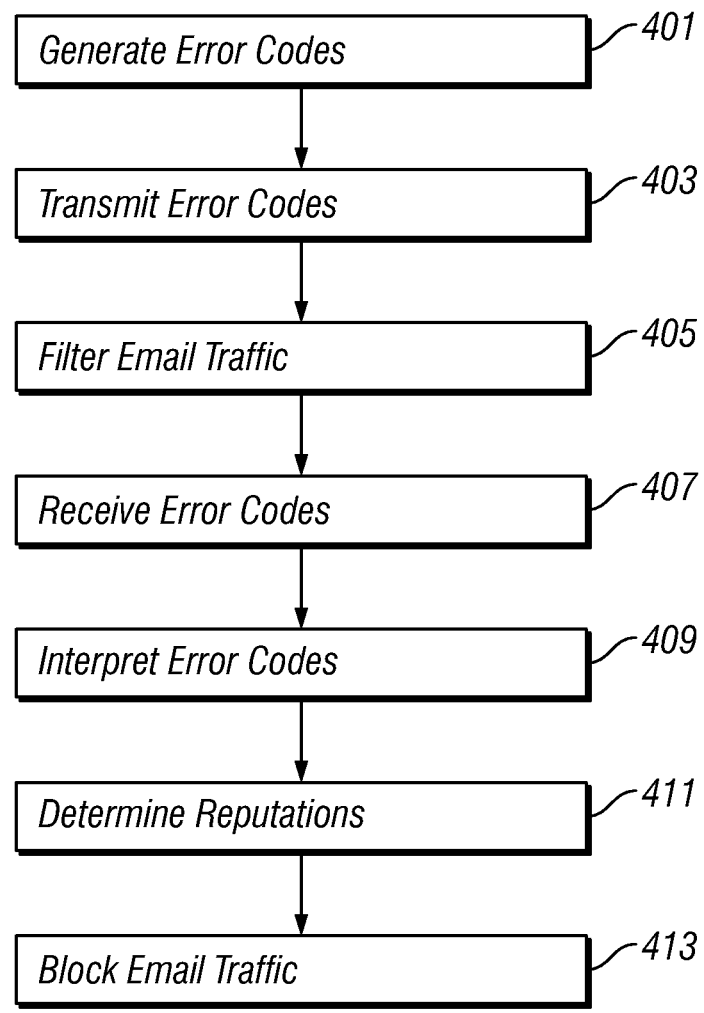
FIG. 4 is a flowchart of the operation of an antispam management system, according to some embodiments.

FIG. 4 illustrates steps for the operation of the antispam management system 101 (FIG. 1), according to some embodiments. The error code generating module 309 (FIG. 3) of the antispam management system 101 (FIG. 1) running on the MTA 305 (FIG. 3) generates 401 specific error codes 311 (FIG. 3) indicating adjudications of specific email traffic 303 (FIG. 3) to be spam. The error code transmitting module 310 (FIG. 3) of the antispam management system 101 (FIG. 1) running on the MTA 305 (FIG. 3) transmits 403 the generated specific error codes 311 (FIG. 3) to the corresponding sources 307 of the specific email traffic 303 (FIG. 3). The filtering module 302 (FIG. 3) of the antispam management system 101 (FIG. 3) running on the antispam computing device 301 (FIG. 3) filters 405 email traffic 303 (FIG. 3) between the MTA 305 (FIG. 3) and a plurality of sources 307 (FIG. 3). The error code receiving module 313 (FIG. 3) of the antispam management system 101 (FIG. 1) running on the antispam computing device 301 (FIG. 3) receives 407 error codes 311 (FIG. 3) sent by the MTA 305 (FIG. 3) to specific sources 307 (FIG. 3) in response to specific email traffic 303 (FIG. 3). The error code interpreting module 315 (FIG. 3) of the antispam management system 101 (FIG. 1) interprets 409 specific error codes 311 (FIG. 3) as adjudications by the MTA 305 that corresponding email traffic 303 (FIG. 3) comprises spam. In some embodiments, the source reputation determining module 319 of the antispam management system 101 (FIG. 1) determines 411 reputations of sources 307 (FIG. 3) of email traffic 303 (FIG. 3), based on the interpretations of error codes 311 (FIG. 3). The blocking module 317 (FIG. 3) blocks 413 email traffic 303 (FIG. 3) originating from specific sources 307 (FIG. 3) before it reaches the MTA 305 (FIG. 3), based on the interpretation of the error codes 311 (FIG. 3) and/or the determined reputations.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for unloading blocking of spam email traffic from a message transfer agent to an antispam computing device, the method comprising the steps of:
   receiving, by the antispam computing device, email traffic between the message transfer agent and a plurality of sources of email traffic, the message transfer agent being primarily responsible for delivery of email traffic to network components;
   detecting specific error codes in the email traffic as defined by a protocol of the email traffic, by the antispam computing device from the message transfer agent, the specific error codes being transmitted by the message transfer agent to sources of email traffic in response to specific email traffic received by the message transfer agent;
   wherein the specific error codes of the protocol of the email traffic 1) simulate non-spam based errors, whether or not a non-spam based error has occurred, to the sources of the email traffic and 2) alert the antispam computing device that the message transfer agent has adjudicated the specific email traffic to comprise spam;
   interpreting, by the antispam computing device, the specific received error codes transmitted by the message transfer agent in response to the specific email traffic as indicating that the message transfer agent adjudicated the specific email traffic to comprise spam; and
   blocking, by the antispam computing device, at least some email traffic from at least one source based on interpreting the specific received error codes, such that the blocked email traffic does not reach the message transfer agent.

2. The method of claim 1 further comprising:
   determining, by the antispam computing device, reputations of specific sources of email traffic from error codes received from the message transfer agent sent to the specific sources; and
   blocking, by the antispam computing device, attempts to deliver email messages by at least one source, based on a corresponding determined reputation, such that the blocked attempts do not reach the message transfer agent.

3. The method of claim 2 wherein determining, by the antispam computing device, reputations of specific sources of email traffic from error codes received from the message transfer agent sent to the specific sources further comprises:
   analyzing content of at least some email messages from the specific sources, by the antispam computing device; and
   using analysis of the content from the specific sources to aid in determining the reputations of specific sources, by the antispam computing device.

4. The method of claim 1 wherein interpreting, by the antispam computing device, specific received error codes transmitted by the message transfer agent in response to specific email traffic as indicating that the message transfer agent adjudicated the specific email traffic to comprise spam further comprises:
   interpreting, by the antispam computing device, error codes with a specific value as indicating that the message transfer agent adjudicated the specific email traffic to be spam at connection time.

5. The method of claim 1 wherein interpreting, by the antispam computing device, specific received error codes transmitted by the message transfer agent in response to specific email traffic as indicating that the message transfer agent adjudicated the specific email traffic to comprise spam further comprises:
   interpreting, by the antispam computing device, error codes with a specific value as indicating that the message transfer agent adjudicated the specific email traffic to be spam at content time.

6. The method of claim 1 further comprising:
   generating, by the message transfer agent, specific error codes indicating that the message transfer agent has adjudicated specific received email traffic to comprise spam; and
   transmitting, by the message transfer agent, the generated specific error codes to sources of the specific received email traffic.

7. At least one non transitory computer readable storage medium storing a computer program product for unloading blocking of spam email traffic from a message transfer agent to an antispam computing device, the computer program product comprising:
   program code for receiving, by the antispam computing device, email traffic between the message transfer agent and a plurality of sources of email traffic, the message transfer agent being primarily responsible for delivery of email traffic to network components;
   program code for detecting specific error codes in the email traffic as defined by a protocol of the email traffic, by the antispam computing device from the message transfer agent, the specific error codes being transmitted by the message transfer agent to sources of email traffic in response to specific email traffic received by the message transfer agent;
   wherein the specific error codes of the protocol of the email traffic 1) simulate non-spam based errors, whether or not a non-spam based error has occurred, to the sources of the email traffic and 2) alert the antispam computing device that the message transfer agent has adjudicated the specific email traffic to comprise spam;
   program code for interpreting, by the antispam computing device, the specific received error codes transmitted by the message transfer agent in response to the specific email traffic as indicating that the message transfer agent adjudicated the specific email traffic to comprise spam; and
   program code for blocking, by the antispam computing device, at least some email traffic from at least one source based on interpreting the specific received error codes, such that the blocked email traffic does not reach the message transfer agent.

8. The computer program product of claim 7 further comprising:
   program code for determining reputations of specific sources of email traffic from error codes received from the message transfer agent sent to the specific sources; and
   program code for blocking attempts to deliver email messages by at least one source, based on a corresponding determined reputation, such that the blocked attempts do not reach the message transfer agent.

9. The computer program product of claim 8 wherein the program code for determining reputations of specific sources of email traffic from error codes received from the message transfer agent sent to the specific sources further comprises:
   program code for analyzing content of at least some email messages from the specific sources; and program code for using analysis of the content from the specific sources to aid in determining the reputations of specific sources.

10. The computer program product of claim 7 wherein the program code for interpreting specific received error codes transmitted by the message transfer agent in response to specific email traffic as indicating that the message transfer agent adjudicated the specific email traffic to comprise spam further comprises:
program code for interpreting error codes with a specific value as indicating that the message transfer agent adjudicated the specific email traffic to be spam at connection time.

11. The computer program product of claim 7 wherein the program code for interpreting specific received error codes transmitted by the message transfer agent in response to specific email traffic as indicating that the message transfer agent adjudicated the specific email traffic to comprise spam further comprises:
program code for interpreting error codes with a specific value as indicating that the message transfer agent adjudicated the specific email traffic to be spam at content time.

12. The computer program product of claim 7 further comprising:
program code for generating specific error codes indicating that the message transfer agent has adjudicated specific received email traffic to comprise spam; and
program code for transmitting the generated specific error codes to sources of the specific received email traffic.

13. A computer system for unloading blocking of spam email traffic from a message transfer agent to an antispam computing device, the computer system comprising:
the message transfer agent comprising at least a processor and system memory, the message transfer agent being primarily responsible for delivery of email traffic to network components;
the antispam computing device comprising at least a processor and system memory;
a filtering module running in the system memory of the antispam computing device, the filtering module being configured to receive email traffic between the message transfer agent and a plurality of sources of email traffic;
an error code receiving module running in the system memory of the antispam computing device, the error code receiving module being configured to detect specific error codes in the email traffic as defined by a protocol of the email traffic from the message transfer agent, the specific error codes being transmitted by the message transfer agent to sources of email traffic in response to specific email traffic received by the message transfer agent;
wherein the specific error codes of the protocol of the email traffic 1) simulate non-spam based errors, whether or not a non-spam based error has occurred, to the sources of the email traffic and 2) alert the antispam computing device that the message transfer agent has adjudicated the specific email traffic to comprise spam;
an error code interpreting module running in the system memory of the antispam computing device, the error code interpreting module being configured to interpret the specific received error codes transmitted by the message transfer agent in response to the specific email traffic as indicating that the message transfer agent adjudicated the specific email traffic to comprise spam; and
a blocking module running in the system memory of the antispam computing device, the blocking module being configured to block at least some email traffic from at least one source based on interpreting the specific received error codes, such that the blocked email traffic does not reach the message transfer agent.

14. The computer system of claim 13 further comprising:
a source reputation determining module running in the system memory of the antispam computing device, the source reputation determining module being configured to determine reputations of specific sources of email traffic from error codes received from the message transfer agent sent to the specific sources; and wherein
the blocking module is further configured to bock attempts to deliver email messages by at least one source, based on a corresponding determined reputation, such that the blocked attempts do not reach the message transfer agent.

15. The computer system of claim 14 wherein the source reputation determining module is further configured to:
analyze content of at least some email messages from the specific sources; and
use analysis of the content from the specific sources to aid in determining the reputations of specific sources.

16. The computer system of claim 13 wherein the antispam computing device further comprises:
a transparent antispam proxy.

17. The computer system of claim 13 wherein the antispam computing device further comprises:
an antispam gateway.

18. The computer system of claim 13 further comprising:
an error code generating module running in the system memory of the message transfer agent, the error code generating module being configured to generate specific error codes indicating that the message transfer agent has adjudicated specific received email traffic to comprise spam;
an error code transmitting module running in the system memory of the message transfer agent, the error code transmitting module being configured to transmit the generated specific error codes to sources of the specific received email traffic.

* * * * *